US006959263B2

(12) United States Patent
Wilson et al.

(10) Patent No.: US 6,959,263 B2
(45) Date of Patent: Oct. 25, 2005

(54) INTERACTIVE DIAGNOSTIC SYSTEM AND METHOD DRIVEN BY EXPERT SYSTEM

(75) Inventors: Gerald A. Wilson, Cupertino, CA (US); Aaron Wilson, Campbell, CA (US)

(73) Assignee: Perspicuous Insights LLC, San Marcos, CA (US)

( * ) Notice: Subject to any disclaimer, the term of this patent is extended or adjusted under 35 U.S.C. 154(b) by 0 days.

(21) Appl. No.: 10/318,868

(22) Filed: Dec. 14, 2002

(65) Prior Publication Data

US 2004/0117151 A1 Jun. 17, 2004

(51) Int. Cl.[7] .............................................. G06F 15/00
(52) U.S. Cl. ........................ 702/185; 702/183; 702/184
(58) Field of Search ................................ 702/182, 183, 702/184, 185, 186; 714/26, 43; 706/45, 46, 47

(56) References Cited

U.S. PATENT DOCUMENTS 4,697,243 A * 9/1987 Moore et al. ................. 706/59
5,483,637 A * 1/1996 Winokur et al. .............. 714/26
5,490,089 A * 2/1996 Smith et al. .................. 399/81

* cited by examiner

*Primary Examiner*—Bryan Bui
(74) *Attorney, Agent, or Firm*—Galvin Patent Law LLC; Brian R. Galvin

(57) ABSTRACT

The present invention discloses a unique interactive diagnostic system and method driven by expert systems. In particular, a system and method for troubleshooting of networked electronic devices, driven by an inference engine which controls both the user interaction and the operation of and collection of data from diagnostic tools, are disclosed. In an exemplary embodiment, the invention includes a knowledge base 200, an inference engine 201, a communications processor 210 for handling requests to and from the inference engine and the other components (except the knowledge base), an interaction management processor 220 for handling interactions with a plurality of end users 230 over a communications network 240, and a plurality of peripheral control units 250 and their associated peripheral units 250, which collectively can gather status information and perform diagnostic tests on the said networked electronic devices.

20 Claims, 5 Drawing Sheets

INTERACTIVE DIAGNOSTIC SYSTEM AND METHOD DRIVEN BY EXPERT SYSTEM

BACKGROUND AND SUMMARY OF THE INVENTION

This invention relates to diagnostic systems generally and, more specifically, to expert systems-based diagnostic systems.

With the continual increase in the complexity, ubiquity and importance to users of networked electronic devices such as cable modems, personal computers, security systems and the like, the demand for diagnostic services for these devices is exploding. The costs of these services tend to be high, since the systems to be serviced are often widely dispersed. The high costs of diagnosing equipment problems is exacerbated when interaction with the end user is desirable or unavoidable, since the costs of maintaining a sufficient inventory of skilled technicians to service all customer inquiries in a timely fashion is high, as is the cost of the systems required to support said technicians.

It has become common in the art for expert systems to be used by skilled technicians to assist in quickly diagnosing equipment problems. Such systems are well-known in the art, and generally proceed by what is known as case-based reasoning using inference engines. Basically, a series of facts is provided to the inference engine, which then applies rules to these facts. These rules may then prompt the service technician to perform specific tests or measurements, the results of which become in turn new facts to feed into the inference engine. The body of rules and facts used by the inference engine is known as the knowledge base. In general, highly specialized knowledge bases are built up in the art to capture as much of the knowledge of a particular problem domain, such as troubleshooting cable modems or home security systems, as possible. While it is most common for expert systems to be used by experts, there is a trend in the art to make these systems available to the end users by placing an easy-to-use interface such as a web page or an interactive troubleshooting menu between the end user and the expert system.

Another trend in the art is to make available, to trained technicians, testing interfaces. Such interfaces allow the trained technician to perform tests on electronic devices such as cable modems without regard for their physical location, by sending commands over a data network such as the Internet and receiving the results over the same network, in both cases via these test interfaces. For example, in the cable modem industry, technicians located at a cable provider's head-end office, which is the provider facility located at the nearest point to the cable subscriber, can send test commands to the cable modem over the cable. Similarly, technicians can attempt to "ping" the cable modem over the Internet to check if it is properly connected to the Internet and properly configured as a member of the network (pinging is a technique well known in the art, in which a simple data packet is passed to the target machine and returned from it back to the originator; it checks that the machines are connected via the network and it measures the round trip time to send and receive the packets). These tools are available for many types of electronic equipment; another example is the ability of home security system service providers to query the state of detectors at a home from their monitoring facilities. Of course, the types of monitoring and testing facilities described here are not typically available to the end users of the electronic systems.

The end user must contact the service provider when a problem occurs, and a trained technician must perform any diagnostics.

To make clear the shortcomings of the current situation, refer to FIG. 1. Consider the scenario of an end user 101 of a cable modem Internet service who is unable to connect to the Internet 106 from his home computer. The user makes a phone call over the public switched telephone network 102 to the cable company to get assistance. A support technician 100 is connected to the end user, and requests the customer's home phone number. The technician queries a Customer Relationship Management (CRM) application 110 using the end user's phone number to obtain customer information, which is stored in a relational database 115. The technician confirms the end user's identity and then asks the customer to hold for a moment. Using a network management software system 130 the technician looks up the customer's Internet Protocol (IP) address and the machine ID of the cable modem 105. Armed with this complete information about the end user the technician opens a new case in his diagnostic software system 120 (which in some embodiments is included as a submodule of the CRM software system 110). The diagnostic software, in a process well known in the art, asserts the information about the new case to the inference engine 121, which adds the facts thus asserted to the modem knowledge base 125. The knowledge base contains a large set of facts and rules pertaining to cable modem diagnostics, in essence comprising a large subset of the knowledge possessed by skilled technicians in a structured, machine-usable form. When facts are added to the knowledge base, the inference engine looks for rules in the knowledge base which match the new facts, possibly in conjunction with existing facts. If rules are found (for instance, a rule for the "new case entered" fact), the inference engine activates those rules. Activation of a rule means that whatever is specified as the output of the rule is asserted. The output is typically one or more new facts, which in turn can trigger new rules. The inference engine proceeds until it has exhausted all facts and rules that are triggered by the initial fact assertion.

During this process, the inference engine may print out prompts to the technician, such as "ping the modem". The technician would do this by sending a standard ping request over the Internet 106 to the cable modem, a technique well established in the art. The technician, after pinging the cable modem, would assert the result of the ping test as a new fact in the inference engine. This fact may in turn trigger other rules. Other common actions which would be prompted by the inference engine in this scenario would include using software interfaces available in the art to the cable company head-end office 140 to send commands to, and receive status information from, the cable modem via the direct test connection 150 (that is, directly from the cable head-end to the cable modem, without using the Internet or its protocols). Such tests can determine certain fault conditions in the cable modem hardware or software, and can reinitialize the cable modem software. It will also be common for the inference engine to prompt the technician to ask the end user questions such as "tell me what lights you see on your cable modem", or "please check to ensure the cable is tightly connected to the cable modem, and let me know what you found when you are done".

Using these various sources of data, the inference engine provides the technician with assistance by providing an ordered series of steps to attempt to determine and correct the problem with the cable modem. This scenario is typical of the diagnostic systems in common use for addressing problems with electronic devices. Systems used for other types of devices, such as home or commercial building security systems, personal computers, game playing systems with Internet connections, and many other Internet- or telephony-enabled devices (i.e., devices with a connection to any network that makes diagnostics possible), will differ in their details based on the unique systems appropriate to the device and network characteristics (for example, security systems do not have head-end offices but rather monitoring centers). However, the general approach outlined in this scenario is typical of those in use in the art.

One disadvantage inherent in the art as described in the above scenario is that the components used in the prior art scenario do not operate as a system, but rather as a set of tools that are available to the trained technician. Some systems in the art combine an expert system with diagnostic tools analogous to the ping and modem test tools in the scenario just presented. Other systems have provided a limited degree of self-service capability to the end users by providing the end user with web-based frequently asked questions (FAQ's) guides, or simple case-based reasoning (e.g., "Try this . . . did it work? . . . no? . . . then try this . . . "). In all the systems extant in the art, however, there are essential components which remain outside the system, and the systems rely heavily on the trained technicians to solve problems completely. Since trained technicians are expensive to recruit, train, and retain, it is clearly desirable to deploy systems in which the expert system, the end user, and the diagnostic tools interwork seamlessly without the need for technician intervention for most problems (expert systems known in the art generally would be able to solve a large fraction of reported problems if all information were readily at hand). The present invention is addressed, among other things, to this need for interactive diagnostic systems driven by expert systems. In particular, a method and system for troubleshooting of networked electronic devices, driven by an inference engine which controls both the user interaction and the operation of and collection of data from diagnostic tools, are disclosed.

The term event as used in this specification and the claims attached hereto is used to refer both to the notification that an event has occurred (such as a call arriving at a switch, or a database query being completed), as well as to the passing of the data associated with that event (in the two examples, this would be the number at which the call is arriving and potentially the number from which the call came, and the results of the database query, respectively); it is common in the art for events to be passed as data packets which indicate the event that occurred, where it occurred and when, and which provides associated data as part of the event packet. This should be understood to be the meaning of the word event herein unless specifically stated otherwise for a particular instance of the word.

BRIEF DESCRIPTION OF THE DRAWINGS

The present invention is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiments only, and is not intended to limit the scope, applicability or configuration of the invention. Rather, the ensuing description of the preferred exemplary embodiments will provide those skilled in the art with an enabling description for implementing a preferred exemplary embodiment of the invention. It should be understood that various changes may be made in the function and arrangement of elements without departing from the spirit and scope of the invention as set forth in the appended claims.

The present invention discloses a unique interactive diagnostic method and system driven by expert systems. In particular, a system for troubleshooting of networked electronic devices, driven by an inference engine which controls both the user interaction and the operation of and collection of data from diagnostic tools, is disclosed, as is a method for using the said system for troubleshooting networked electronic components.

Figure 1:
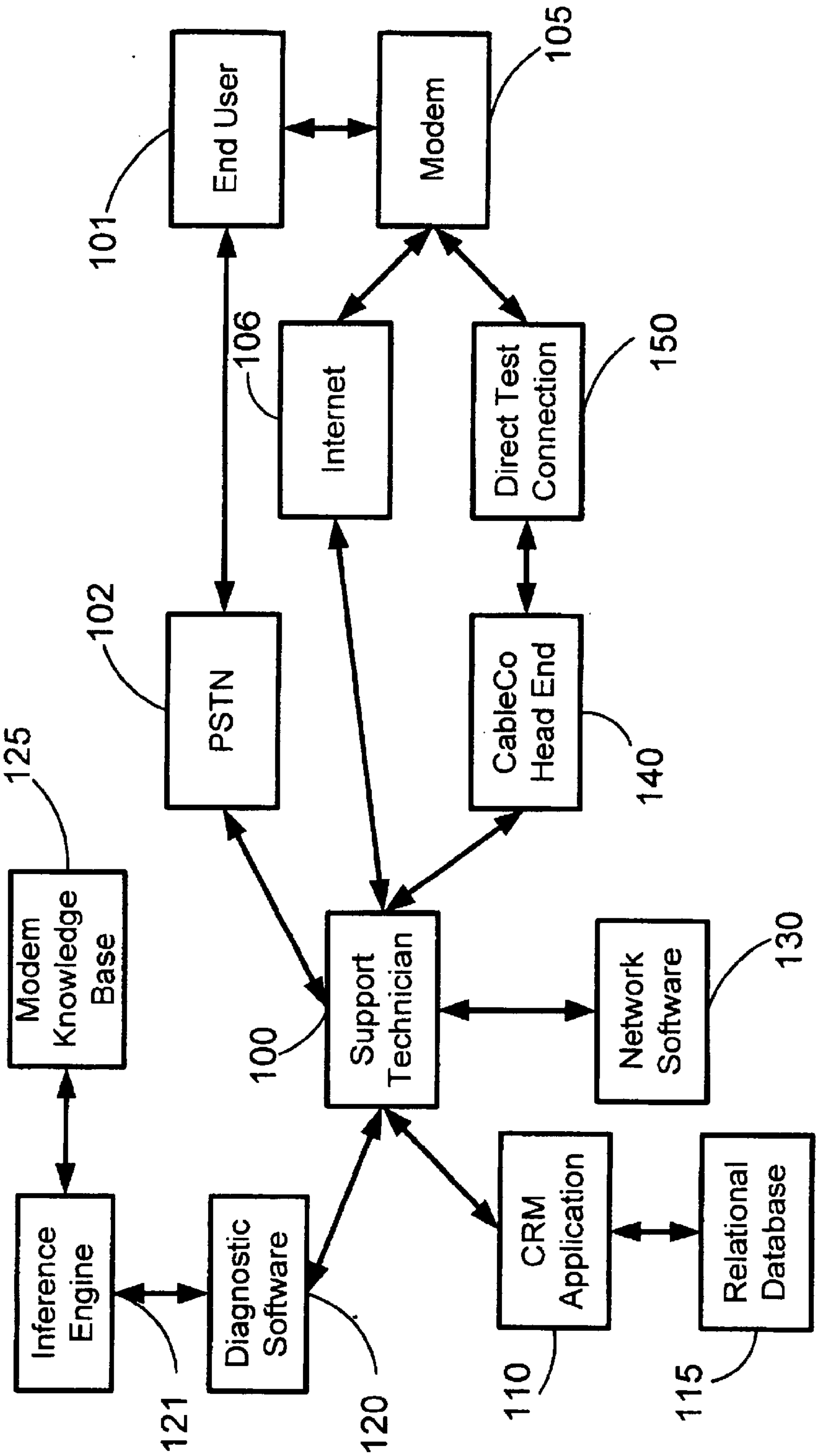
FIG. 1 is a depiction of a prior art diagnostic system.
Figure 2:
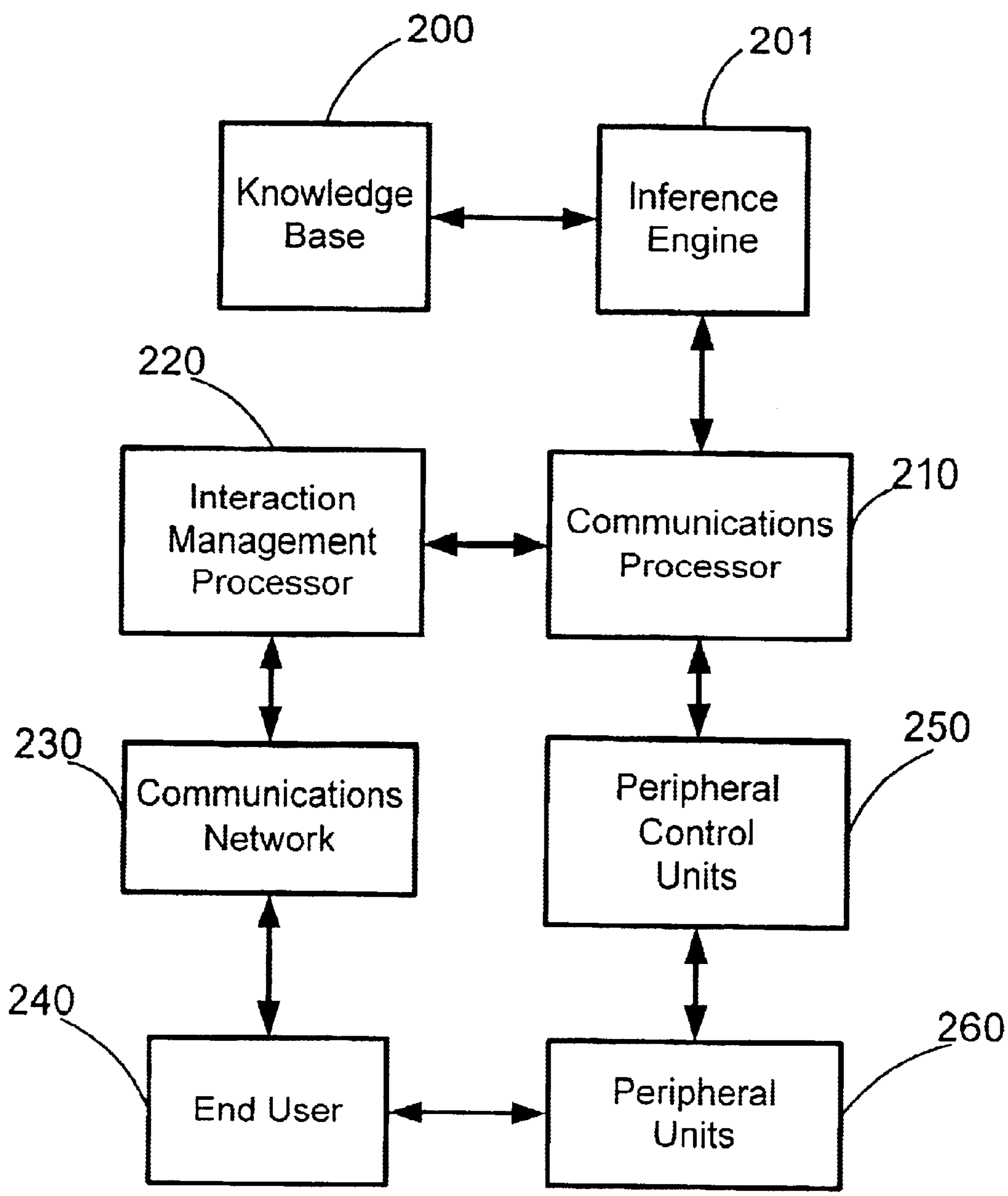
FIG. 2 is a depiction of a general embodiment of the invention showing its principal components.

In a preferred exemplary embodiment, and referring to FIG. 2, the invention provides a system comprising:

a) A knowledge base 200 containing facts and rules that encompass a significant fraction of the knowledge available to trained technicians in the field of a particular said networked electronic device;

b) An inference engine 201 similar to that known in the art which acts on the said facts and rules in the said knowledge base;

c) A communications processor 210 which receives events from the other components shown in FIG. 2, determines the appropriate target components for the said events, and transmits the said events to the said target components;

d) A plurality of peripheral control units 250 which receive events from the said communications processor, translate them into a protocol appropriate for the destination peripheral unit to which the said events will be sent, and sends the said events to the said destination peripheral units, and which also processes events in the opposite direction, namely from the peripheral unit to the communications processor;

e) A plurality of peripheral units 260 which can collect status information from, or direct diagnostic testing in, the said networked electronic device or its associated network, when directed by command events from the peripheral control unit, and which passes the results of said status collection or said diagnostic tests back to the peripheral control unit in the form of an event; and f) An interaction management processor 220 which receives events from an end user 240, which said events are transmitted to the interaction management processor over a communications network 230, and converts said events into a suitable protocol for passing to the communications processor, and which receives events from the communications processor which are translated into an appropriate protocol for transmission over said communications network to said end user.

In another embodiment of the invention, the system just described and shown in FIG. 2 lacks the communications processor 210. In this embodiment, the perhiperal control units 250 and the interaction management processor 220 communicate directly with the inference engine 201. In order for this to occur, these components must be aware of the location of the inference engine, and must communicate with the inference engine in a protocol that is comprehensible by the inference engine. There are many means well established in the art for allowing potentially dispersed software processes to intercommunicate across a network. These include, but are clearly not limited to, the use of web services (wherein the inference engine would expose an HTTP interface to the other components), the use of Java with Remote Method Invocation, or the use of the Distributed Component Object Model (DCOM).

In another embodiment of the invention, the Communications Processor consists of two components, a post office processor and a registration table which is stored in memory or alternatively in a flat file or relational database. The registration table contains one row of data for each component which requires the services of the communications processor. Each row contains a data element or field which describes the type of component to which the row refers (this is important because it determines the particular communications protocol that must be used to communicate with the component referred to), and the address to which messages for that component should be sent. This address can be one of many types common in the art including, but not limited to, the Uniform Resource Locator (URL), the socket address (normally IP address followed by colon followed by the socket number), or a queue number (when using message queuing systems established in the art, such as Microsoft Message Queue). Each of the components that uses the communications processor of this embodiment must register with the communications processor (the location to which the component must send its registration can be stored in a configuration data file, in the system registry or environment variables, or in any of a large number of ways well established in the art), and the component must provide, at registration time, the two pieces of information (namely, component type and message delivery address). It can be seen that this embodiment, which is exemplary of one of the many ways well known in the art of establishing interprocess communications, allows each component to interoperate with the other components without knowing where the other components are, or what message protocol is needed.

Figure 3:
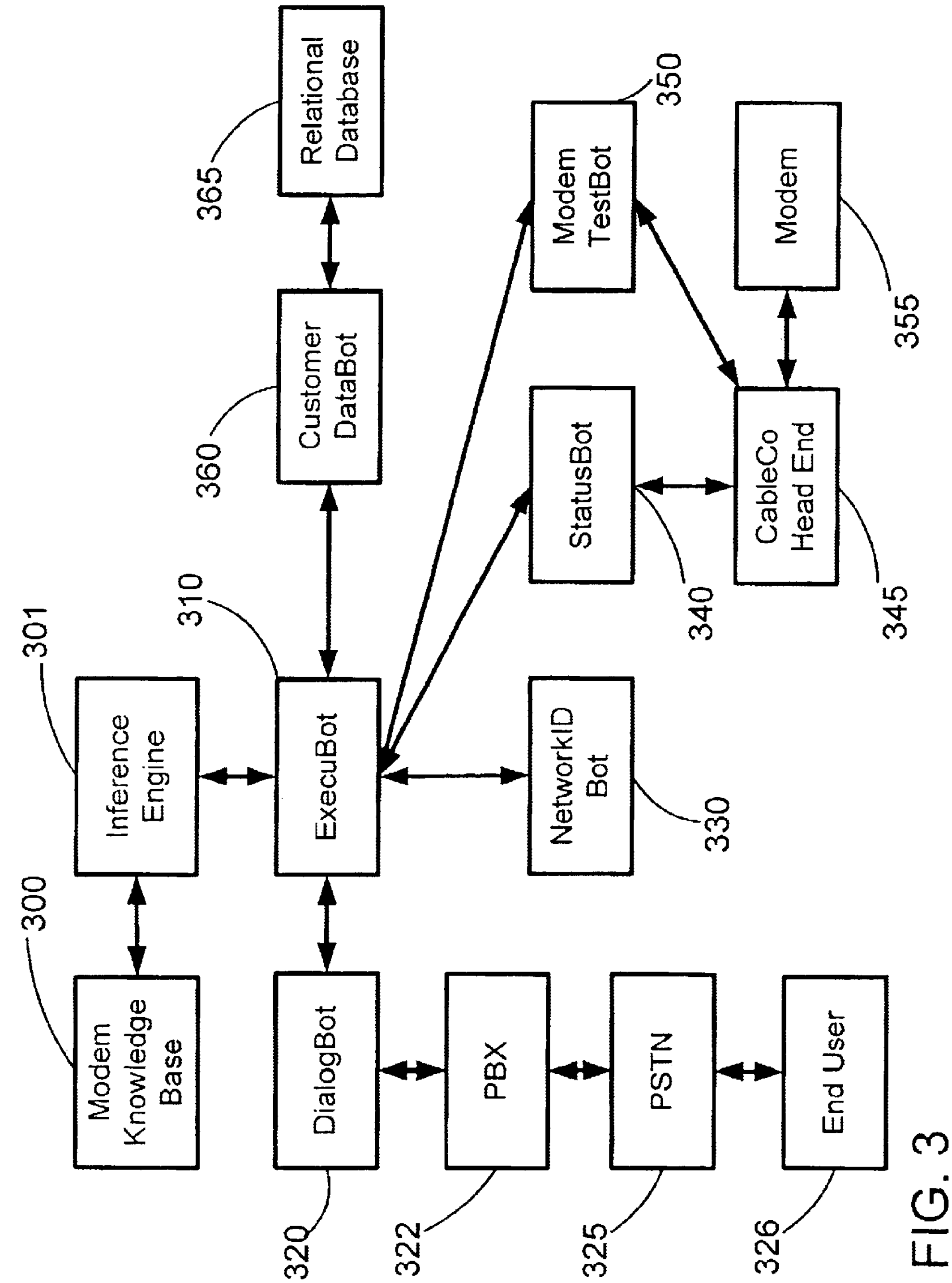
FIG. 3 is a depiction of a specific embodiment of the invention pertaining to cable modem diagnostics.

In one exemplary embodiment of the present invention and referring to FIG. 3, the networked electronic device is a cable modem 355. When an end user 226 has troubles with his cable modem, he contacts the cable provider by phone over the public switched telephone network (PSTN) 225. The telephone call is received in a PBX 322 at one of a plurality of the cable operator's facilities. Using computer-telephony integration techniques well known in the art, the PBX notifies one of a plurality of DialogBots 320 of the incoming call, and passes the automated number identification (ANI), or CallerID, to the DialogBot. The DialogBots collectively constitute an interaction management processor 220 in the sense described above.

The DialogBots are standalone software modules which receive events from the PBX and send them to the ExecuBot 310, which in turn serves as the communications processor 210 described above. DialogBots are also able to receive commands from the ExecuBot when necessary, such as "Ask the customer for his phone number, and return the value received". It should be understood that the DialogBots, ExecuBots and other software modules (or "Bots") described herein can be written in any of a plurality of programming languages including, but not limited to, C, C++, C#, Java or Perl. When a DialogBot is notified of the call arrival, and of the ANI of the caller, it translates the information into an event which is comprehensible by the ExecuBot, and passes the event to the ExecuBot. The ExecuBot passes all events received from the DialogBots to the inference engine by calling a notification function of the inference engine 301 (the ability to call an inference engine in this fashion is well known within the art, and can be accomplished with readily available expert engine systems such as CLIPS (www.clips.org)). The ANI and the call arrival are asserted as facts in the inference engine, and these said facts are added to the knowledge base 300. In the standard way well known in the art, these fact assertions cause the inference to search for any rules that may be activated by the existence of these new facts.

The knowledge base of the present embodiment is pre-configured to contain a plurality of rules which collectively provide it the ability to troubleshoot the majority of known failure modes common to cable modems. These rules will be used to gather the required information based on the facts known at any given moment, and to interpret the information gathered as a result to further the problem resolution process (again, by applying rules already in the knowledge base to the new facts gathered). This method of problem solving using expert systems is known in the art as case based reasoning. In the present embodiment, there will be a "NewCallReceived" rule in the knowledge base which will be triggered when a DialogBot notifies the inference engine (via a fact assertion by the ExecuBot) that a new call has arrived. The rule will typically assert one or a plurality of facts, including one which executes a function that sends a message to the ExecuBot telling it to request relevant customer data from a Customer DataBot 360. The Customer DataBot is a software module which receives requests from the ExecuBot and packages them as requests to a relational database 365, such as Oracle or Microsoft SQL Server. The requests from the Customer DataBot to the relational database can be in Structured Query Language (SQL), or in one of many standard database interface protocols well known in the art, including but not limited to ODBC or JDBC. Relevant customer data would typically include customer name, cable modem serial number, and account status. The Customer DataBot will send an event back to the ExecuBot on completion of the database query, either notifying it of failure of the query (due, for example, to poor formation of the query, lack of connectivity to the database, or failure to find a customer record with the ANI provided), or passing it the relevant customer information. In either case, the ExecuBot formats the event received from the Customer DataBot and sends it to the inference engine as another set of fact assertions.

It should be understood that whenever mention is made hereinafter of the inference engine's directing the ExecuBot to direct some other module to do something, the steps just described wherein the inference engine, based on a rule activation, asserts a fact which consists of a function invocation, said function's role being to invoke an event notification function in the ExecuBot, with appropriate arguments, which event the ExecuBot then passes to the appropriate module, are implied.

If the fact asserted (indirectly) by the Customer DataBot is that the query failed, then a rule "CustomerDataQuery- Failed" would be activated (there could be a plurality of such rules, for different failure modes, but one will suffice to illustrate the concept, it being understood that others are possible within the invention). This said CustomerDataQueryFailed rule would assert a fact which directs the ExecuBot to direct the DialogBot to request the customer's name and, optionally, cable modem serial number from the end user. The DialogBot requests the required information from the end user via one of a plurality of means available in the art for customer interaction via the PSTN, including but not limited to an IVR with prepared scripts, a VoiceXML script, or similar means. The data received from the end user is then passed to the inference engine via the ExecuBot as before, and asserted as a new set of facts in the inference engine. These new facts would then trigger rules which would repeat the database query to verify the customer information.

If the appropriate customer information is available as facts in the inference engine, either because the initial database query was successful, or because the data was obtained from the customer, a rule is activated which asserts a plurality of facts which cause several things to happen in parallel. The inference engine instructs the ExecuBot to direct the Network IDBot 330 to query the network configuration database for the IP address of the cable modem assigned to said end user, or of the cable modem with said serial number. The Network IDBot is a software module which can interface directly into one or a plurality of network configuration database systems common in the art. Further, the inference engine instructs the StatusBot 340 to query the cable company's head-end office 345 for the status of the said cable modem. The StatusBot is a software module which provides an interface to the cable company head-end office's software systems, which are specialized systems well known in the art. The Network IDBot and StatusBot each send the requested information back to the inference engine via the ExecuBot, which asserts the information as yet another fact set. Based on the IP address, which is asserted as a fact in the inference engine, there will be a "ValidIPAddressObtained" rule in the knowledge base which causes the inference engine to direct the ExecuBot to ping the cable modem and to assert the results of the ping attempt as a fact to the inference engine (either PingSucceeded or PingFailed would be the asserted facts).

A final element of this embodiment is the ability of the inference engine, when required by the activation of an applicable rule following a fact assertion, to execute a plurality of tests of the cable modem using the Modem TestBot 350, a software module which provides an interface to the cable modem via a direct connection to the head-end unit. The Modem TestBot will also send the results of said tests back to the inference engine as fact sets asserted by the ExecuBot. Such test interfaces exist in the art, but the ability to direct them from a case-based reasoning system is novel. It should be understood that the StatusBot, Network IDBot, Customer DataBot and Modem TestBot are exemplars of Peripheral Control Units 250.

It can be seen that the method and system just described in several exemplary embodiments is capable of executing a complex set of rules-based steps to troubleshoot problems in cable modems, with access available within the inference engine to the end user (for gathering additional data, including such additional data elements as the status of lights on the cable modem), and to a plurality of peripheral systems, all mediated by the ExecuBot, which performs message handling duties, and the peripheral control units and interaction management processor, which collectively translate requests received from the expert system (taken to be, collectively, the knowledge base and the inference engine) into the appropriate forms for the target systems or components, and converting the replies or events from those target systems into facts which can asserted in the inference engine by the ExecuBot.

In a preferred embodiment, and referring to FIG. 2, the invention provides a method of troubleshooting a networked electronic device comprising the steps of:

a) an end user 240 sending a fault notification via a communications network 230 (which said communication network can be any of the Internet, a public or private telephone system or combination of the two, a local or wide area network or combination of the two, or any of a plurality of other well-established communications network types known in the art) to an interaction management processor 220;

b) the said interaction processor translating the said fault notification into a format that is readable by the communications processor 210, and sending the said fault notification to the said communications processor;

c) the said communications processor sending the said fault notification (or event in the sense described herein) to an inference engine 201;

d) the said inference engine asserting said fault notification or event as a new fact in a knowledge base 200 containing facts and rules that encompass a significant fraction of the knowledge available to trained technicians in the field of a particular said networked electronic device;

d) the said inference engine applying rules from the said knowledge base, which said rules are triggered by the newly asserted fact in conjunction with previously asserted facts in the knowledge base (said action of facts in triggering ruels being well established in the art of expert system);

e) the said rules optionally causing the inference engine to send a command to one or a plurality of the peripheral units via the communications processor and the peripheral control units, or to the end user via the interaction management processor, the purpose of said commands being to obtain status information pertinent to the fault in the said networked electronic device, or to conduct diagnostic tests to gather information concerning the said networked electronic device;

f) the said end user and optionally the said peripheral devices providing responses to the said commands from the said inference engine;

g) the said responses in turn triggering the said inference engine to assert new facts into the said knowledge base;

h) the said new facts optionally triggering new rules in the said knowledge base;

i) the said inference engine thus gathering data and following rules to troubleshoot the said networked electronic devices, until either the fault is resolved to the satisfaction of the end user or the fault and all associated data including data concerning the steps taken already in troubleshooting it, is referred to a human technician for further troubleshooting.

Figure 4:
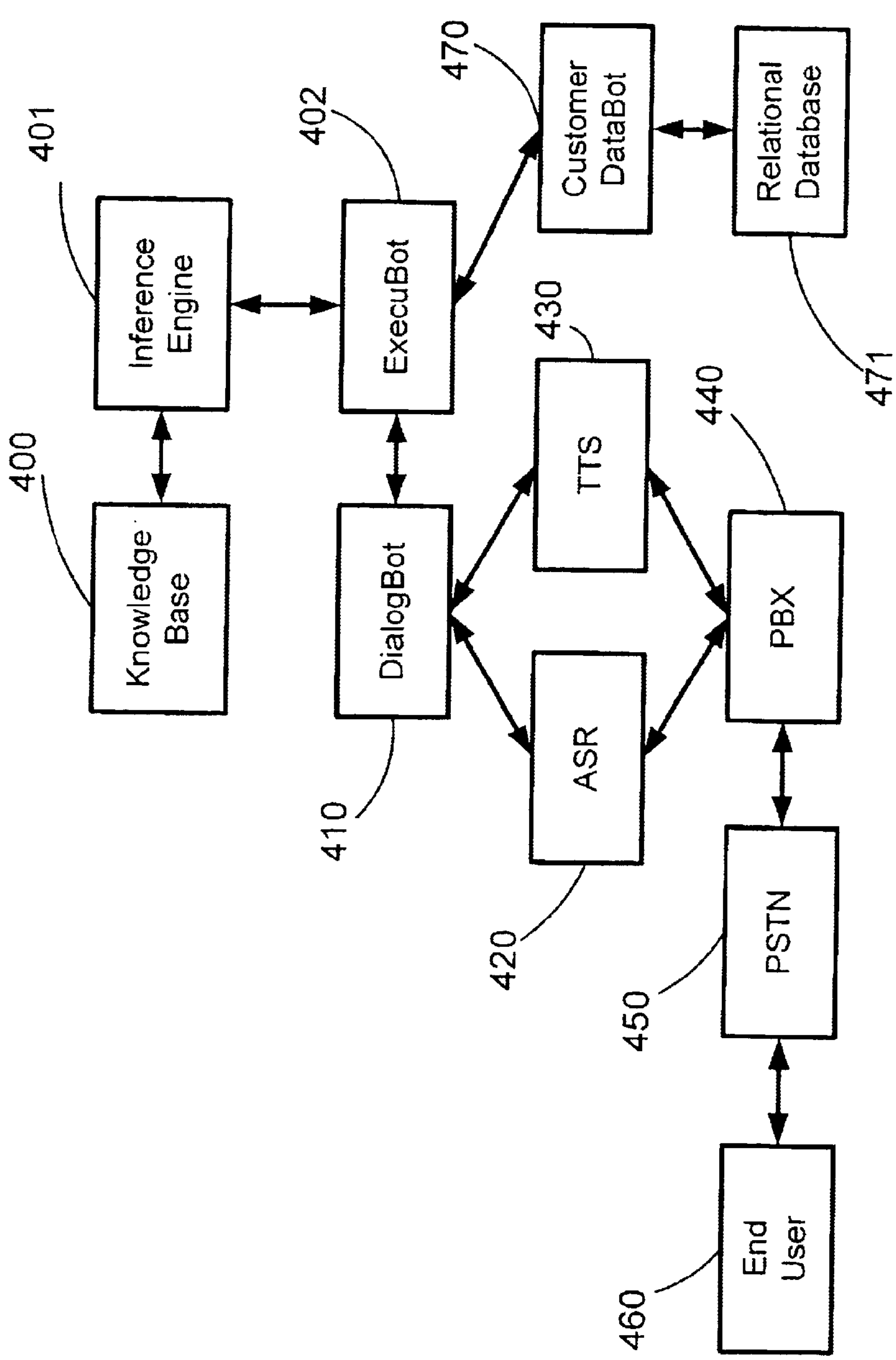
FIG. 4 is a depiction of an embodiment of a typical communications subsystem of the invention.

A number of variations and modifications of the invention can also be used. For example and referring to FIG. 4, in one embodiment of the invention a knowledge base 400 contains a set of rules and facts pertaining to the particular networked electronic device for which the system is being used, and it interacts as before through with the remainder of the system via an inference engine 402. The inference engine passes fact assertions which require execution of commands through an ExecuBot 402, as before, and receives events from the other modules in the same fashion. The ExecuBot provides access, for the inference engine, to a Customer DataBot 470 and if needed a plurality of other Peripheral Control Units 250. The Customer DataBot interacts with a relational database 471 which contains all relevant data about the customers who own or operate one or a plurality of the networked electronic devices to be supported by the invention. For gathering information from and giving direction to the end users 460, a DialogBot 410 is used as before. In this embodiment the DialogBot receives semantically rich data from an automated speech recognition system (ASR) 420, which is used to recognize words spoken by the end user and turn speech into text. Similarly, the DialogBot can prompt the end user for additional information, or give directions to the end user for taking any troubleshooting steps that require end user operation of the networked electronic device, by using a text-to-speech engine (TTS) 430 to translate textual information passed from the ExecuBot to verbal information which can listened to by the end user. TTS and ASR systems are well known in the art. The voice path between them and the end user is provided by a private branch exchange switch (PBX) 440 connected to the public switched telephone network (PSTN) 450.

The use of ASR and TTS systems under the control of an inference engine allows a much richer user interaction according to the invention. For example, on activation of a rule within the expert system following assertion of a fact, the inference engine can specify what grammar should be used by the ASR component for the next user interaction, and what text prompt should be played. To illustrate, the grammar could be named Grammar_LightStatus and could consist of words such as "red", "yellow", "flashing", "steady", and so forth. Use of grammar driven speech recognition greatly improves recognition accuracy (since the ASR engine is expecting to hear certain words or sets of words, it tends to resolve ambiguities to satisfy the specified grammar). Use of different grammars for different specific situations, under the control of the inference engine, makes it possible to provide a near-natural language experience for the end user.

Figure 5:
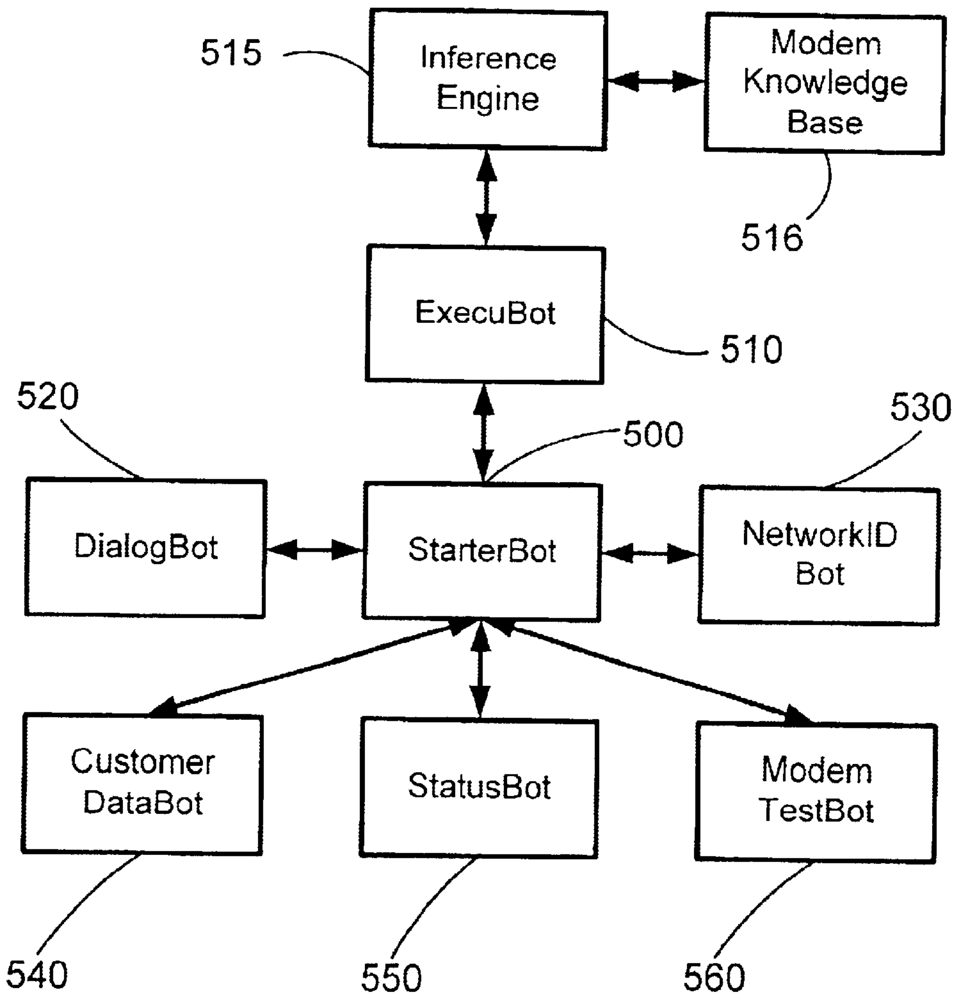
FIG. 5 is a depiction of an embodiment of the invention in which a StarterBot is used to start and monitor other processes of the invention.

A further improvement of the present invention, and referring to FIG. 5, is the use of a StarterBot 500 to make the system more robust. The StarterBot, on being started, starts an instance of the ExecuBot 510 and awaits notification that initialization of the ExecuBot is complete. When that notification is received, the StarterBot then starts at least one instance of each of the following: DialogBot 520, Customer DataBot 540, StatusBot 550, Modem TestBot 560, and Network IDBot 530. The StarterBot passes the address of the ExecuBot to each of these on startup, so that the "worker Bots" (those Bots other than the StarterBot and ExecuBot, which are in effect system Bots) each know how to contact the ExecuBot. It should be noted that in those embodiments which are without a StarterBot, the location of the ExecuBot must be provided as a configuration option (this is normally accomplished in the art through the use of configuration files, environment variables or registry entries in Windows environments). Note also that in all embodiments of the invention it is not necessary for the various worker Bots to know the location of any other worker Bots; since the ExecuBot knows where they all are, they rely on the ExecuBot for this function. For example, the inference engine can have a rule that says in effect "send a request to the user, via a DialogBot, to confirm his name is John Smith, and return the result back to me as a fact". The ExecuBot would select one from among a plurality of operating DialogBots and send the appropriate request.

While the principles of the invention have been described above in connection with specific methods and systems, it is to be clearly understood that this description is made only by way of example and not as limitation on the scope of the invention.

What is claimed is:

1. A system for troubleshooting of networked electronic devices, comprising:

an input responsive to verbal or text commands from an operator;

said operator not being required to have any specialized knowledge;

an inference engine computer program;

a data storage for containing a knowledge base for use by said inference engine; and a plurality of peripheral devices suitable for gathering information about, sending information to, or gathering operational data from said networked electronic devices;

wherein said operator provides text or verbal commands to said input to notify the system of a fault in said networked electronic devices, and said input asserts a fact to said inference engine, said fact corresponding to said text or verbal commands, and said inference engine adds said fact to said knowledge base, and said inference engine applies rules from said knowledge base which are triggered by said fact in conjunction with a plurality of previously asserted facts contained in said knowledge base, said rules including one or a plurality of rules requiring said inference engine to send commands to one or a plurality of said peripheral devices or to said input, said commands from said inference engine being for the purpose of gathering data about said networked electronic devices, and said peripheral devices and said input provide responses to said commands from said inference engine, which said responses in turn trigger said inference engine to assert new facts into said knowledge base, which said new facts may trigger new rules to be executed by said inference engine, said inference engine thus gathering data and following rules to troubleshoot said networked electronic devices.

2. The system of claim 1, wherein one of the plurality of said peripheral devices is said networked electronic devices.

3. The system of claim 1, wherein said networked electronic devices to be troubleshot are cable modems.

4. The system of claim 1, wherein said networked electronic devices to be troubleshot are building security systems.

5. The system of claim 1, further comprising:

a communications processor that mediates the communications between said inference engine program and said input and said plurality of peripheral devices by receiving events from one of said peripheral devices or said input, transforming the events into a computer-readable format suitable for use by the inference engine program, and then sending the transformed event to said inference engine computer program, and by receiving commands from said inference engine program, converting those commands into a format appropriate for said input or one of the plurality of said peripheral devices, and then sending the transformed command to said input or one of the plurality of said peripheral devices.

6. The system of claim 1, further comprising:

a communications processor that mediates the communications between said inference engine program and said input and said plurality of peripheral devices by receiving events from one of said peripheral devices or said input, transforming the events into a computer-readable format suitable for use by the inference engine program, and then sending the transformed event to said inference engine computer program, and by receiving commands from said inference engine program, converting those commands into a format appropriate for said input or one of the plurality of said peripheral devices, and then sending the transformed command to said input or one of the plurality of said peripheral devices; and a computer with a stored program that exerts executive control over the system, wherein said stored program automatically starts said inference engine computer program, said communications processor, said input, and the plurality of peripheral control devices, and informs said inference engine program, input and said plurality of peripheral devices of location of said communications processor, whereby each of the components is capable of communicating as needed by the system while utilizing a single point of configuration for the system, namely the startup configuration of said stored program.

7. The system of claim 1, wherein the input includes an automated speech recognition computer program for receiving verbal commands from said operator, and a text-to-speech computer program for rendering commands from said inference engine program to said operator verbally.

8. A method for troubleshooting of networked electronic devices, comprising the steps of:

an operator sending text or verbal commands to an input device, said commands functioning to notify the system of a problem with said networked electronic devices;

said operator not being required to have any specialized knowledge;

said input device asserting a fact to an inference engine, which said fact corresponds to said verbal or text commands;

said inference engine adding said fact to a knowledge base;

said inference engine applying rules from said knowledge base that are triggered by the assertion of said fact, in conjunction with a plurality of previously asserted facts contained in said knowledge base;

said inference engine sending commands specified by one or a plurality of said rules to one or a plurality of said peripheral devices or to said input, said commands from said inference engine being for the purpose of gathering data about said networked electronic devices;

said input and said peripheral devices providing responses to said commands from said inference engine;

said responses in turn triggering said inference engine to assert new facts into said knowledge base;

said new facts optionally triggering new rules in said knowledge base;

said inference engine thus gathering data and following rules to troubleshoot said networked electronic devices; and said inference engine finally either resolving the problem with said networked electronic device or, optionally, said inference engine suspends troubleshooting when no more rules are triggered in said knowledge base, and leaves the fault for resolution by a human technician.

9. The method of claim 8, wherein one of the plurality of said peripheral devices is said networked electronic devices.

10. The method of claim 8, wherein said networked electronic devices to be troubleshot are cable modems.

11. The method of claim 8, wherein said networked electronic devices to be troubleshot are building security systems.

12. The method of claim 8, further comprising the steps of:

the verbal commands from said operator being translated into text by an automated speech recognition system; and the commands from said inference engine to said operator being converted by a text to speech system into verbal requests.

13. A system for troubleshooting of cable modems, comprising:

an input responsive to verbal or text commands from an operator;

said operator not being required to have any specialized knowledge;

an inference engine computer program;

a data storage for containing a knowledge base for use by said inference engine; and a plurality of peripheral devices suitable for gathering information about, sending information to, or gathering operational data from said cable modems;

wherein said operator provides text or verbal commands to said input to notify the system of a fault in said cable modems, and said input asserts a fact to said inference engine, said fact corresponding to said text or verbal commands, and said inference engine adds said fact to said knowledge base, and said inference engine applies rules from said knowledge base which are triggered by said fact in conjunction with a plurality of previously asserted facts contained in said knowledge base, said rules including one or a plurality of rules requiring said inference engine to send commands to one or a plurality of said peripheral devices or to said input, said commands from said inference engine being for the purpose of gathering data about said cable modems, and said peripheral devices and said input provide responses to said commands from said inference engine, which said responses in turn trigger said inference engine to assert new facts into said knowledge base, which said new facts may trigger new rules to be executed by said inference engine, said inference engine thus gathering data and following rules to troubleshoot said cable modems.

14. The system of claim 13, wherein one of the plurality of said peripheral devices is said cable modems.

15. The system of claim 13, further comprising:

a communications processor that mediates the communications between said inference engine program and said input and said plurality of peripheral devices by receiving events from one of said peripheral devices or said input, transforming the events into a computer-readable format suitable for use by the inference engine program, and then sending the transformed event to said inference engine computer program, and by receiving commands from said inference engine program, converting those commands into a format appropriate for said input or one of the plurality of said peripheral devices, and then sending the transformed command to said input or one of the plurality of said peripheral devices.

16. The system of claim 13, further comprising:

a communications processor that mediates the communications between said inference engine program and said input and said plurality of peripheral devices by receiving events from one of said peripheral devices or said input, transforming the events into a computer-readable format suitable for use by the inference engine program, and then sending the transformed event to said inference engine computer program, and by receiving commands from said inference engine program, converting those commands into a format appropriate for said input or one of the plurality of said peripheral devices, and then sending the transformed command to said input or one of the plurality of said peripheral devices; and a computer with a stored program that exerts executive control over the system, wherein said stored program automatically starts said inference engine computer program, said communications processor, said input, and the plurality of peripheral control devices, and informs said inference engine program, input and said plurality of peripheral devices of location of said communications processor, whereby each of the components is capable of communicating as needed by the system while utilizing a single point of configuration for the system, namely the startup configuration of said stored program.

17. The system of claim 13, wherein the input includes an automated speech recognition computer program for receiving verbal commands from said operator, and a text-to-speech computer program for rendering commands from said inference engine program to said operator verbally.

18. The system of claim 13, wherein the peripheral devices include one of a cable head-end management system that provides cable system status information, a customer database, a network address database, or a cable modem test device capable of sending and receiving test signals to and from said cable modem directly.

19. A method for troubleshooting of cable modems, comprising the steps of:

an operator sending text or verbal commands to an input device, said commands functioning to notify the system of a problem with said cable modems;

said operator not being required to have any specialized knowledge;

said input device asserting a fact to an inference engine, which said fact corresponds to said verbal or text commands;

said inference engine adding said fact to a knowledge base;

said inference engine applying rules from said knowledge base that are triggered by the assertion of said fact, in conjunction with a plurality of previously asserted facts contained in said knowledge base;

said inference engine sending commands specified by one or a plurality of said rules to one or a plurality of said peripheral devices or to said input, said commands from said inference engine being for the purpose of gathering data about said cable modems;

said input and said peripheral devices providing responses to said commands from said inference engine;

said responses in turn triggering said inference engine to assert new facts into said knowledge base;

said new facts optionally triggering new rules in said knowledge base;

said inference engine thus gathering data and following rules to troubleshoot said cable modems.

20. The method of claim 19, wherein one of the plurality of said peripheral devices is said cable modems.

* * * * *